US012235426B2

(12) United States Patent
Stallinga et al.

(10) Patent No.: US 12,235,426 B2
(45) Date of Patent: Feb. 25, 2025

(54) CONFOCAL LASER SCANNING MICROSCOPE CONFIGURED FOR GENERATING LINE FOCI

(71) Applicant: KONINKLIJKE PHILIPS N.V., Eindhoven (NL)

(72) Inventors: Sjoerd Stallinga, Delfgauw (NL); Leon Van Der Graaff, Delft (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 860 days.

(21) Appl. No.: 17/278,064

(22) PCT Filed: Sep. 16, 2019

(86) PCT No.: PCT/EP2019/074698
§ 371 (c)(1),
(2) Date: Mar. 19, 2021

(87) PCT Pub. No.: WO2020/058187
PCT Pub. Date: Mar. 26, 2020

(65) Prior Publication Data
US 2021/0349296 A1 Nov. 11, 2021

(30) Foreign Application Priority Data
Sep. 20, 2018 (EP) .................................. 18195790

(51) Int. Cl.
*G02B 21/00* (2006.01)
(52) U.S. Cl.
CPC ..... *G02B 21/0032* (2013.01); *G02B 21/0048* (2013.01); *G02B 21/006* (2013.01); *G02B 21/0076* (2013.01)
(58) Field of Classification Search
CPC ............ G02B 21/0032; G02B 21/0048; G02B 21/006; G02B 21/0076; G02B 21/002;
(Continued)

(56) References Cited

U.S. PATENT DOCUMENTS

| 5,248,876 A | 9/1993 | Kerstens |
| 5,304,810 A | 4/1994 | Amos |

(Continued)

FOREIGN PATENT DOCUMENTS

| DE | 10118463 A1 | 10/2002 |
| DE | 102011117523 B3 | 4/2013 |

(Continued)

OTHER PUBLICATIONS

PCT International Search Report, International application No. PCT/EP2019/074698, Dec. 20, 2019.
(Continued)

*Primary Examiner* — Stephone B Allen
*Assistant Examiner* — Adam W Booher
(74) *Attorney, Agent, or Firm* — Sherry Austin

(57) ABSTRACT

The present disclosure relates to a microscopic imaging system for three-dimensional imaging An optical system is provided for focusing illumination light generated by a light source to form a plurality of foci within an object. The optical system is further configured so that the foci, when seen relative to an optical axis of the optical system along which the illumination light is incident on the object, are mutually displaced from each other in an axial direction and mutually displaced from each other in a lateral direction. The optical system and/or a detector system are configured to compensate for the displacement along the axial direction so that for each of the foci, a light receiving portion of the detector system which receives a portion of the detection light is substantially located at a position which is optically conjugate to at least a portion of the respective focus.

13 Claims, 6 Drawing Sheets

(58) Field of Classification Search
CPC .............. G02B 21/0024; G02B 21/008; G02B 21/367; G02B 21/00; G02B 21/36; G01N 21/64

See application file for complete search history.

(56) References Cited

U.S. PATENT DOCUMENTS

| | | | |
|---|---|---|---|
| 6,288,382 | B1 | 9/2001 | Ishihara |
| 6,731,383 | B2 | 5/2004 | Watkins |
| 7,224,523 | B2 | 5/2007 | Fukuyama |
| 7,456,378 | B2 | 11/2008 | Sasaki |
| 9,857,578 | B2 | 1/2018 | Boehme |
| 10,082,663 | B2 | 9/2018 | Hulksen |
| 10,433,733 | B2 | 10/2019 | Wang |
| 10,459,209 | B2 | 10/2019 | Knebel |
| 10,642,012 | B2 | 5/2020 | Tamano |
| 10,653,376 | B2 | 5/2020 | Yun |
| 10,802,256 | B2 | 10/2020 | Anhut |
| 11,530,990 | B2 | 12/2022 | Fiolka |
| 2006/0012785 | A1 | 1/2006 | Funk |
| 2019/0129156 | A1* | 5/2019 | Knebel .................. G02B 21/16 |

FOREIGN PATENT DOCUMENTS

| | | |
|---|---|---|
| JP | 2016001274 A | 1/2016 |
| WO | WO2017053891 A1 | 3/2017 |

OTHER PUBLICATIONS

Takiguchi Y. et al., "Mechanical Scanner-Less Multi-Beam Confocal Microscope with Wavefront Modulation", The 5th Asian and Pacific-Rim Symposium on Biophotonics, (APBP'15), Yokohama, Japan, Opt Rev (2016) 23:364-368.

Chanbai S. et al., "A novel Confocal Line Scanning Sensor", Proc. of SPIE vol. 7378 737822-1, 2009.

Nielsen T. et al., "High Efficiency Beam Splitter for Multifocal Multiphoton Microscopy", Journal of Microscopy, vol. 201, Pt 3, Mar. 2001, pp. 368-376.

Wolleschensky R. et al., "High-Speed Confocal Fluorescence Imaging with a Novel Line Scanning Microscope", Journal of Biomedical Optics, vol. 11(6), 064011-1, Nov./Dec. 2006.

* cited by examiner

CONFOCAL LASER SCANNING MICROSCOPE CONFIGURED FOR GENERATING LINE FOCI

CROSS-REFERENCE TO RELATED APPLICATIONS

This patent application claims the priority benefit under 35 U.S.C. § 371 of International Patent Application no. PCT/EP2019/074698, filed Sep. 16, 2019, which claims the benefit of European Patent Application No. EP18195790.3, filed on Sep. 20, 2018. These applications are hereby incorporated by reference herein in their entirety.

FIELD OF THE INVENTION

The present invention relates to a three-dimensional optical imaging system which is configured to efficiently acquire three-dimensional images from an object using a plurality of line foci which are generated within the object.

BACKGROUND OF THE INVENTION

Many of today's biomedical research efforts center around investigations of complex dynamic processes in cells, tissues and model organisms. These processes take place at different timescales. Considering the required spatial resolution for these investigations, confocal laser scanning microscopy is a suitable technique, since it allows highly resolved visualization of biological material. Confocal microscopy is an optical imaging technique which provides increased optical resolution and contrast of a micrograph by means of a spatial pinhole which is configured to block out-of-focus light. Typically, the pinhole is illuminated with reflected or fluorescence light which is emitted from the sample in response to illumination with a laser beam which is focused to a fine spot within the sample. Raster-scanning the laser focus through the sample allows capturing multiple two-dimensional images at different depths, thereby enabling reconstruction of three-dimensional structures within an object. Furthermore, using fluorescence labelling techniques allows visualization of individual biomolecules or structures of cells with high selectivity. However, since the laser focus needs to be scanned through the object, for many biological processes, the achievable temporal resolution of confocal laser scanning microscopes is not sufficient.

A further application area for confocal laser scanning microscopy is digital pathology in which digital image data of slides of tissue are acquired for later analysis. However, also in this application, the long time which is required for acquiring three-dimensional image data does not fit within a clinical workflow which has to deal with an ever-increasing amount of patient data. In addition, the lateral extension of a tissue slide often exceeds the size of the field of view of the imaging system, necessitating either stitching of sequentially recorded images of adjacent fields of view or operation in conjunction with a second scanning operation, in which the sample is scanned with respect to the imaging system so that all relevant parts of the tissue slide are within the field of view of the imaging system at some time point during the entire image acquisition process.

Similar problems exist in other microscopic imaging techniques which rely on focused light beams.

Therefore, a need exists for a microscopic imaging technique, which provide a shorter image acquisition time.

SUMMARY OF THE INVENTION

Embodiments of the present disclosure pertain to a microscopic imaging system. The imaging system comprises a light source for generating illumination light; an optical system; a detector system. The optical system is configured to focus the illumination light to simultaneously form a plurality of foci within an object to be inspected so that detection light is emitted by the object from the foci in response to the illumination light. The optical system is further configured to direct the detection light to the detector system, which is configured to detect the detection light. The optical system is further configured so that the foci, when seen relative to an optical axis of the optical system along which the illumination light is incident on the object, are mutually displaced from each other in an axial direction and mutually displaced from each other in a lateral direction. For each of the foci generated in the object, the detector system and the optical system are configured to substantially separately detect the detection light which is emitted from the respective focus. The optical system and the detector system are configured to compensate for the displacement along the axial direction. The optical system and/or the detector are configured so that for each of the foci, a light receiving portion of the detector system which receives a portion of the detection light is substantially located at a position which is optically conjugate to at least a portion of the respective focus.

The microscopic imaging system may be a confocal imaging system, in particular a scanning confocal imaging system. The microscopic imaging system may be configured for three-dimensional imaging. The object may be at least partially transparent for the illumination light and the detection light. By way of example, the object may be a tissue slice. The tissue slice may be taken from a biopsy sample or a resection sample.

The light source may include a laser. The laser may be configured to emit light radiation having one or more wavelengths within a range of between 200 nanometers and 1800 nanometers or within a range of between 300 and 1500 nanometers. The laser light may be configured to emit light radiation having a wavelength that is suitable for exciting fluorophores, such as DAPI, FITC, or several species of fluorescent proteins, which typically operate with excitation wavelengths ranging from the near ultraviolet, through the visible range, to the near infrared. The illumination light generated by the laser may be monochromatic or substantially monochromatic. The optical system may include a beam splitter system, which is in the illumination light and the detection light between the light source and the object. By way of example, the beam splitter system may include a dichroic beam splitter (such as a dichroic mirror) and/or a cube beam splitter. The beam splitter may separate the detection light from the illumination light. The detection light may include fluorescence emission light may have a wavelength which is larger than a wavelength of excitation light which is included in the illumination light. The beam splitter may be sensitive to a propagation direction and/or to a wavelength of the light.

The foci are located within or substantially within a common plane. A normal to the common plane may be angled relative to the optical axis along which the illumination light is incident on the object. By way of example, the angle may be greater than 0.01 degrees or greater than 0.03 degrees or greater than 0.3 degrees or greater than 1 degree. The angle may be less than 6 degrees or less than 4.5 degrees. Each of these values are measured in air, i.e. without taking into account the refractive index of the object.

The optical system of the microscopic imaging system may be configured so that for each pair of the foci and measured in air, the axial displacement is greater than 10 nanometers, or greater than 30 nanometers, or greater than 50 nanometers, or greater than 100 nanometers, or greater than 200 nanometers, or greater than 300 nanometers or greater than 500 nanometers. For the pair of foci, which has the smallest axial displacement, the axial displacement, measured in air, may be less than 150 micrometers, or less than 100 micrometers, or less than 50 micrometers, or less than 20 micrometers, or less than 10 micrometers, or less than 5 micrometers, or less than 1 micrometer.

For each pair of the foci, the axial displacement, measured in air, may be larger than 0.2 times or larger than 0.5 times an axial diameter of a diffraction-limited focal spot of the optical system, measured along the optical axis along which the illumination light is incident on the object. The diffraction limited spot may be determined based on properties of the optical system and without considering the light source and the object (i.e. assuming a numerical index of 1). For the pair of foci, which has the smallest axial displacement, the axial displacement, measured in air, may be smaller than 150 times, or smaller than 100 times the axial diameter of the diffraction-limited focal spot, measured along the optical axis. The diameter may be a full width at half maximum (FWHM) diameter.

The axial diameter of a diffraction-limited focal spot of an optical system, measured along the optical axis and in a focal plane of the optical system, may be defined to be equal to $\lambda/(2(n-\sqrt{n^2-NA^2}))$, where $\lambda$ is the excitation wavelength, n is the refractive index of the object, and NA is the object-side numerical aperture of the optical system that produces the focus, defined as NA=n sin α, with α the angle between the optical axis of the optical system and the marginal ray of the beam converging to the focus.

The optical system of the microscopic imaging system may be configured so that for each pair of the foci, and measured in air, the lateral displacement is greater than 100 nanometers, or greater than 200 nanometers, or greater than 300 nanometers, or greater than 500 nanometers. For the pair of foci having the smallest lateral displacement, the lateral displacement, measured in air, may be less than 300 micrometers, less than 200 micrometers, less than 100 micrometers or less than 50 micrometers, or less than 20 micrometers, or less than 10 micrometer, or less than 1 micrometer.

The lateral displacement, measured in air, may be larger than 0.2 times or larger than 0.5 times a lateral diameter of a diffraction-limited focal spot, measured perpendicular to the optical axis. The diffraction limited spot may be determined depending on properties of the optical system and without considering the light source and the object (i.e. assuming a refractive index of 1). For the pair of foci having the smallest lateral displacement, the lateral displacement, measured in air, may be smaller than 150 times or smaller than 100 times times the lateral diameter of the diffraction-limited focal spot. The diameter may be a full width at half maximum (FWHM) diameter or a diameter (corresponding to a first intensity minimum) of an Airy disk.

The lateral diameter of a diffraction-limited focal spot of an optical system, measured perpendicular to the optical axis and in a focal plane of the optical system, may be defined to be equal to 1.22 $\lambda$/NA, where $\lambda$ is the excitation wavelength, n is the refractive index of the object, and NA is the object-side numerical aperture of the optical system that produces the focus, defined as NA=n sin α, with α the angle between the optical axis of the optical system and the marginal ray of the beam converging to the focus.

The detection light may have a spectral distribution which represents one or more wavelength ranges, which are different from one or more wavelength ranges which are represented by a spectral distribution of the illumination light. The detection light may be fluorescent light which is emitted from portions of the sample in response to the illumination light. It is also conceivable that the detection light is reflected illumination light, which is reflected by portions of the object.

A number of the foci which are generated in the object may be equal to or greater than 2, 3, 4, 5 or 10. The number of the foci may be less than 250, less than 130, less than 50 or less than 30. Each of the foci may be a line focus. Each of the line foci may extend along a straight or along a substantially straight longitudinal axis. The longitudinal axes of the line foci may extend parallel or substantially parallel relative to each other.

For each of the foci, a minimum diameter of the respective focus, measured in air, is greater than 200 nanometer, greater than 250 nanometer, or greater than 300 nanometer. The width may be less than 5 micrometer or less than 3 micrometer.

The longitudinal axes of the line foci may be perpendicular or substantially perpendicular to the optical axis along which the illumination light is incident on the object. Additionally or alternatively, the longitudinal axes of the line foci may be substantially perpendicular or perpendicular to the lateral direction along which the lateral displacement of the line foci is measured.

For each of the line foci, an axial length of the line focus, measured in air, may be greater than 1 micrometer or greater than 2 micrometer, or greater than 5 micrometer. The axial length may be less than 10 millimeter or less than 5 millimeter, or less than 1 millimeter, or less than 500 micrometer. For each of the line foci, the axial length may be at least 5 times or at least 10 times or 20 times a lateral diameter (i.e. measured perpendicular to the optical axis) of a diffraction-limited focal spot of the optical system, measured in air, and/or at least 5 times or 15 times a maximum lateral width of the respective line focus, measured perpendicular to the optical axis.

For each of the line foci, a lateral width of the respective line focus, measured perpendicular to the longitudinal axis of the respective line focus and in air may be greater than 200 nanometer, or greater than 250 nanometer, or greater than 300 nanometer or greater than 500 nanometer. The width may be less than 20 micrometer or less than 10 micrometer or less than 5 micrometer, or less than 1 micrometer. For each of the line foci, the width may be greater than the lateral diameter (i.e. measured perpendicular to the optical axis) of the diffraction-limited focal spot of the optical system, measured in air. For each of the line foci, the width may be less than 100 times, less than 10 times or less than 5 times the lateral diameter of the diffraction-limited focal spot, measured perpendicular to the optical axis.

According to a further embodiment, the optical system comprises a correction optical system, which is configured to at least partially compensate a spherical aberration of the optical system. The spherical aberration may affect a shape and/or a position of at least one of the foci. In particular, the spherical aberration may affect a shape and/or a line width of at least one of the line foci. Even more, as is described in more detail below, the spherical aberration affecting the shape and/or the line width of the line foci may be different for each of the affected line foci, since the line foci are located at different depths inside the sample.

The correction optical system may include one or more refractive optical elements and/or one or more diffractive optical elements. At least a portion of the one or more diffractive optical elements may be configured as an addressable spatial light modulator. A refractive optical element could for example be a transparent plate made of glass or quartz or a polymer, that is traversed by the illumination light beam and that has a thickness that depends on the position within the cross-section of the illumination light beam with the refractive optical element. Each of the elements of the correction optical system may be arranged in the illumination light. The correction optical system may be part of or may constitute a beam multiplication system. The beam multiplication system may be configured to generate a plurality of beamlets. The optical system may be configured to focus each of the beamlets into one of the foci within the object.

The correction optical system may be in the illumination light between the light source and the object, in particular between the light source and one or more refractive optical elements of the optical system, which generate at least a portion of the spherical aberration. The optical system may focus the illumination light into the foci within the object using the one or more refractive optical elements. The one or more refractive optical elements may include an objective lens. The objective lens may be a final optical system, which is traversed by the illumination light before being incident on the object.

At least a portion of the spherical aberration may be caused by a numerical aperture at the object, which is greater than or equal to 0.25, or greater than or equal to 0.5. The numerical aperture may be smaller than 2.0, or smaller than 1.5, or smaller than 1.3, or smaller than 1.0.

Maximum concentration of the focusing light in the directions perpendicular to the longitudinal axis of the line foci allows maximum resolution in the direction perpendicular to the line focus' axis if the imaging system is configured as a scanning confocal microscope.

The detector system may include a plurality of light-sensitive detector elements. Each of the light-sensitive detector elements may be configured to detect, separately from one another, a portion of the light, which is incident on a light-sensitive surface of the respective light-sensitive detector element. By way of example, the light-sensitive detector element may be a light-sensitive pixel. The light-sensitive detector elements may be arranged in one or more regular or irregular arrays on a light receiving surface of the detector system. For each of the foci generated in the object, the detection light emitted from the respective focus may be focused or unfocused on a light receiving surface of the detector system.

At least a portion of the light receiving portions may be surface portions of the light receiving surface. At least a portion of the light receiving portions may include one or more light-sensitive detector elements of the detector system, such as for example one or more pixels.

The compensation for the displacement along the axial direction may take into account a refractive index of the object. A value of the refractive index of the object may be greater or equal to 1, greater or equal to 1.2 or greater or equal to 1.3. The refractive index may be less or equal to 4, less or equal to 3, or less or equal to 2.5. The object's refractive index may substantially correspond to water (i.e. 1.33). A primary constituent of the object may be water.

According to a further embodiment, the detector system is configured so that when seen relative to an optical axis of the optical system along which the detection light is incident on the light receiving portions, the light-receiving portions for different foci are axially displaced from each other.

According to a further embodiment, the light receiving portions lie within a common plane or are substantially lying in a common plane. A normal to the common plane is arranged at an angle relative to the optical axis along which the detection light is incident on the light receiving portions. The angle may be dimensioned to at least partially compensate for the axial displacement of the foci in the object. The common plane may be a light receiving surface of the detector system. The angle may be dimensioned so that the refractive index of the object is taken into account.

Additionally or alternatively, it is conceivable that a light receiving surface of the detector has a stepped surface. The stepped surface may be configured to provide light receiving portions which are mutually axially displaced.

According to a further embodiment, for each of the foci, the optical system and the detector system are configured for confocal filtering of the detection light for filtering out at least a portion of the detection light emitted from the respective focus.

According to a further embodiment, for each of the foci, the optical system and the detector system are configured for spatially resolved light detection within the respective focus. The spatial resolution may be a one-dimensional or two-dimensional spatial resolution. For each of the foci generated within the object, the detector system may comprise a plurality of light-sensitive detector elements for separately detecting a portion of the detecting light, which is emitted from the respective focus. Each of the light-sensitive detector elements may detect light from a region within the focus, wherein the region is optically conjugate to the light-sensitive detector element.

According to a further embodiment, each of the light receiving portions is provided by a respective group of light-sensitive detector elements of the detector system. Each of the light-sensitive detector elements may have a light-sensitive surface. A non-photosensitive surface region separates the light-sensitive surfaces of the light-sensitive detector elements of neighboring groups. For each pair of the neighboring light sensitive surfaces which is in one of the groups, a displacement between the light-sensitive surfaces of the pair is less than 0.25 times, or less than 0.1 times, or less than 0.05 times the separation distance. The separation distance may be less than 15 times or less than 45 times or less than 60 times or less than 100 times or less than 200 times the displacement.

The separation distance may be a minimum distance between the light sensitive surfaces of different but neighboring light receiving portions. The displacement between the neighboring light-sensitive surfaces may be measured as a distance between area centers of gravities of the light-sensitive surfaces.

For one or more of the groups, the light-sensitive detector elements of the respective group may form a regular array (such as a rectangular or square array) or an irregular array of light-sensitive surfaces. The array may have a longitudinal shape having a longitudinal axis. The separation distance may be measured perpendicular to the longitudinal axis.

According to a further embodiment, each of the foci is a line focus and wherein for each of the line foci, the spatially resolved light detection is at least along an axis of the respective line focus.

According to a further embodiment, the microscopic imaging system further comprises a scanning system which is configured to generate a relative scanning movement between the foci on the one hand and the object on the other hand. The imaging system may be configured to detect, for each of the foci, the detection light which is emitted from the respective focus at each of a plurality of scanning positions along the scanning path.

The scanning system may be a one-, two-, or three-dimensional scanning system. The scanning system may include a scanning stage on which the object is mountable. The scanning stage may be configured to perform at least a portion of the scanning movement. The relative scanning movement may include a movement of the object and/or the foci substantially perpendicular to the optical axis of the optical system along which the illumination light is incident on the object. Additionally or alternatively, the optical system may include a beam scanning unit which is in the illumination light between the light source and the object. In particular, the scanning unit may be in the illumination light between the beam multiplication system and the object. The scanning unit may include one or more scanning mirrors. The scanning mirrors may be configured to simultaneously displace the foci in a direction perpendicular or substantially perpendicular to the optical axis along which the illumination light is incident on the object.

According to a further embodiment, each of the foci is a line focus. The scanning system may be configured so that a direction of the scanning movement is substantially perpendicular to an axis of at least one of the line foci. The axes of the foci may be oriented parallel or substantially parallel relative to each other.

According to a further embodiment, the optical system includes a beam multiplication system. The beam multiplication system may be in the illumination light between the light source and the object. The beam multiplication system may be configured to generate a plurality of beamlets.

According to a further embodiment, the beam multiplication system is configured to generate the beamlets so that each of the beamlets diverges from or converges toward a real or virtual focus. The optical system may include focusing optics which are configured to focus each of the converging or diverging beamlets into one of the foci within the object.

According to a further embodiment, the beam multiplication system comprises a diffractive optical element, wherein each of the beamlets corresponds to a diffraction order generated by the diffractive optical element. The optical system may be configured so that the illumination light, which is incident on the beam multiplication system, in particular on the diffractive optical element, is a parallel or substantially parallel light beam. In other words, the illumination light, which is incident on the beam multiplication system or the diffractive optical element, includes a beam having plane or substantially plane wavefronts. The wavefronts may be oriented parallel or substantially parallel relative to a diffractive plane of the beam multiplication system or the refractive plane of the diffractive optical element.

The diffractive optical element may be configured so that each of the beamlets is astigmatic. The optical system may be configured to focus each of the astigmatic beamlets into a respective line focus. Therefore, the line-shape of the line foci may be at least partially caused by the astigmatism of the beamlets. The focusing of each of the astigmatic beamlets into a respective line focus may be performed by focusing optics, which are rotationally symmetric or substantially rotationally symmetric relative to a linear, curved and/or angled optical axis of the optical system.

The diffractive optical element may be configured so that each of the beamlets is astigmatic. The astigmatism may at least partially cause the beamlets to be focused into line foci. The astigmatism may be at least partially caused by a phase profile, of the illumination light, which exits from the diffractive optical element.

According to a further embodiment, the diffractive optical element is configured so that illumination light, which exits from the diffractive optical element has a phase profile, measured in a diffraction plane of the diffractive optical element. The phase profile or an additive component of a polynomial representation of the phase profile may have a two-fold rotational symmetry or a substantially two-fold rotational symmetry. The symmetry axis of the two-fold rotational symmetry may be or may substantially be an optical axis of the optical system and/or a beam axis of the illumination beam.

The polynomial representation may be a uniquely determined polynomial representation. An origin of the polynomial representation (i.e. the point, where the parameters of the polynomial have a value of zero) may be located on an optical axis of the optical system and/or on a beam axis of the illumination light, which enters the diffractive optical element.

According to a further embodiment, the phase profile or the additive component is or substantially is a term or a polynomial. The term or the polynomial may be univariate. The univariate term or the univariate polynomial may be of degree 2 or higher or degree 4 or higher.

A ratio of a coefficient of a term of second degree of the univariate polynomial to a coefficient of a term of fourth degree of the univariate polynomial may have a value which is between −1 and −11 times the radius of the beam cross-section of the illumination light at a position, where the illumination light traverses the diffractive optical element. The radius may correspond to a half of the FWHM (full width at half maximum). The cross-section may be taken perpendicular to an axis of the beam of illumination light and/or in a diffractive plane of the diffractive optical element.

Additionally or alternatively, the ratio may be so that for the value p, which is defined by $$p = R/(F^2 \cdot NA^2),$$

with R being the ratio, F being an object-side focal length of focusing optics of the the optical system, which focus the beamlets into the line foci, and NA being the numerical aperture at the object, p has a value of between −3 and −10 or between −4 and −8. By way of example, p has a value of −6.

The inventor has shown that these ranges for the ratio are particularly advantageous for obtaining line foci that have less peak intensity variation and/or less line width variation along the longitudinal axis of the respective line focus.

According to a further embodiment, the beam multiplication system includes a diffractive optical element, which generates the plurality of beamlets and also functions as a correction optical system.

Additionally or alternatively, the diffractive optical element may be configured to compensate, for each of the beamlets, a spherical aberration. The spherical aberration may be at least partially induced by the focusing of the beamlets into the line foci using the focusing optics. As will be explained in detail below, the diffractive optical element allows compensation of different amounts of spherical aberration for each of the different line foci.

A number of the diffraction orders of the diffractive optical element may be identical to the number of foci in the object. The beam multiplication system may be configured to concentrate a power of the illumination light which is incident on the beam multiplication system into a plurality of diffraction orders so that light emission into the remaining diffraction orders is suppressed. In other words, a total light power of the remaining diffraction orders is less than 30% or less than 20% or less than 10% of a total light power of the diffraction orders which are used for forming the foci within the object.

According to a further embodiment, the beam multiplication system comprises an array of refractive optical units, wherein each of the refractive optical units focuses or defocuses a portion of the illumination light to form one of the beamlets. The optical axes of the refractive optical units may be angled relative to an optical axis of the focusing optics along which the beamlets enter the focusing optics or angled relative to a beam axis of a beam of illumination light which is incident on the refractive optical units. The angle may be dimensioned to at least partially the axial displacement of the foci within the object.

According to a further embodiment, the beam multiplication system comprises an addressable spatial light modulator. The addressable spatial light modulator may be an optically addressable and/or an electrically addressable spatial light modulator. The spatial light modulator may be a reflective and/or transmissive spatial light modulator. The addressable spatial light modulator may be configured as a diffractive optical element.

According to a further embodiment, the detection light is fluorescence light, which is generated by the object in response to the illumination light.

The present disclosure relates to the following embodiments:

Item 1: A microscopic imaging system, the imaging system comprising: a light source for generating illumination light; an optical system; a detector system; wherein the optical system is configured: to focus the illumination light to simultaneously form a plurality of foci within an object to be inspected so that detection light is emitted by the object from the foci in response to the illumination light; and to direct the detection light to the detector system, which is configured to detect the detection light; wherein the optical system is further configured so that the foci, when seen relative to an optical axis of the optical system along which the illumination light is incident on the object, are mutually displaced from each other in an axial direction and mutually displaced from each other in a lateral direction; and wherein for each of the foci generated in the object, the detector system and the optical system are configured to substantially separately detect the detection light which is emitted from the respective focus, wherein the optical system and/or the detector system are configured to compensate for the displacement along the axial direction so that for each of the foci, a light receiving portion of the detector system which receives a portion of the detection light is substantially located at a position which is optically conjugate to at least a portion of the respective focus.

Item 2: The imaging system of item 1, wherein the detector system is configured so that when seen relative to an optical axis of the optical system along which the detection light is incident on the detector system, the light-receiving portions for different foci are axially displaced from each other.

Item 3: The imaging system of items 1 or 2, wherein the light receiving portions are substantially arranged in a common plane; wherein a normal to the common plane is arranged at an angle relative to the optical axis along which the detection light is incident on the light receiving portions; wherein the angle is dimensioned to at least partially compensate for the axial displacement of the foci in the object.

Item 4: The imaging system of any one of the preceding items, wherein for each of the foci, the optical system and the detector system are configured for confocal filtering of the detection light for filtering out at least a portion of the detection light emitted from the respective focus.

Item 5: The imaging system of any one of the preceding items, wherein for each of the foci, the optical system and the detector system are configured for spatially resolved light detection within the respective focus.

Item 6: The imaging system of any one of the preceding items, wherein each of the light receiving portions is provided by a respective group of light-sensitive detector elements of the detector system, wherein each of the light-sensitive detector elements has a light-sensitive surface; wherein a non-photosensitive surface region separates the light-sensitive surfaces of the light-sensitive detector elements of neighboring groups. wherein for each pair of the neighboring light sensitive surfaces which is in one of the groups, a displacement between the light-sensitive surfaces of the pair is less than 0.25 times, or less than 0.1 times, or less than 0.05 times the separation distance.

Item 7: The imaging system of any one of the preceding items, wherein each of the foci is a line focus and wherein for each of the line foci, the spatially resolved light detection is at least along an axis of the respective line focus.

Item 8: The imaging system of any one of the preceding items, further comprising a scanning system which is configured to generate a relative scanning movement between the foci in the one hand and the object on the other hand; wherein the imaging system is configured to detect for each of the foci, the detection light which is emitted from the respective focus at each of a plurality of scanning positions along the scanning path.

Item 9: The imaging system of item 8, wherein: each of the foci is a line focus; and the scanning system is configured so that a direction of the scanning movement is substantially perpendicular to an axis of at least one of the line foci.

Item 10: The imaging system of any one of the preceding items, wherein the optical system comprises a beam multiplication system which is the illumination light between the light source and the object and which generates a plurality of beamlets.

Item 11: The imaging system of item 10, wherein: the beam multiplication system is configured to generate the beamlets so that each of the beamlets has a real or virtual focus; and the optical system is configured to image each of the beamlets converging from or diverging toward the real or virtual focus into one of the foci within the object.

Item 12: The imaging system of items 10 or 11, wherein the beam multiplication system comprises a diffractive optical element, wherein each of the beamlets corresponds to a diffraction order generated by the diffractive optical element.

Item 13: The imaging system of any one of items 10 to 12, wherein the beam multiplication system comprises an array of refractive optical units, wherein each of the refractive optical units focuses or defocuses a portion of the illumination light to form one of the beamlets.

Item 14: The imaging system of any one of items 10 to 13, wherein the beam multiplication system comprises an addressable spatial light modulator.

Item 15: The imaging system of any one of the preceding items, wherein the detection light is fluorescence light, which is generated by the object in response to the illumination light.

DETAILED DESCRIPTION OF EMBODIMENTS

Figure 1:
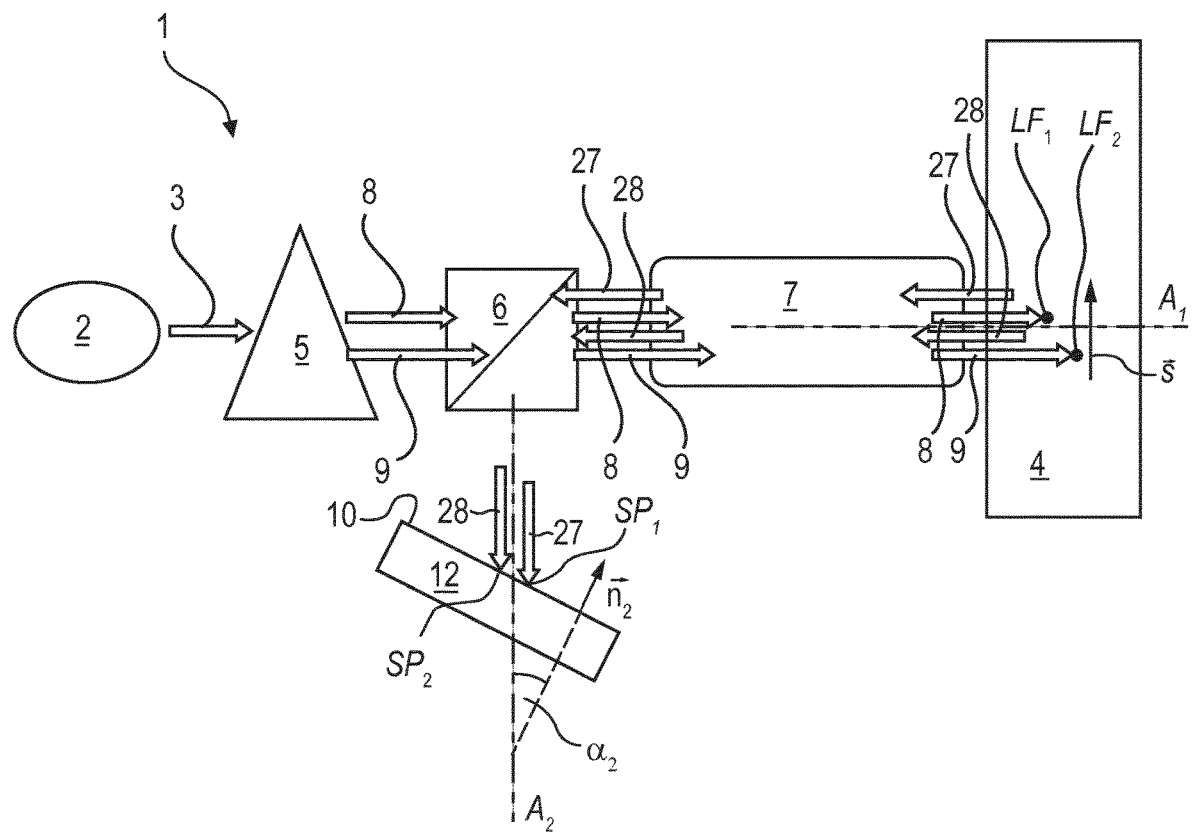
FIG. 1 is a schematic illustration of an imaging system according to a first exemplary embodiment.

FIG. 1 is a schematic illustration of a microscopic imaging system 1 according to a first exemplary embodiment. The microscopic imaging system 1 is configured so that detection light is detected using a detector system 12, wherein the detection light is generated by the object 4 in response to illumination light, which is generated by a light source 2 and which is directed to the object 4. The detection light may include fluorescent light and/or reflected illumination light.

The light source 2 may include a laser system so that the beam 3 of illumination light which is emitted from the light source 2 is a laser beam. However, it is also conceivable (in particular in the third exemplary embodiment which will be described in connection with FIG. 6) that the light source 2 includes a non-laser light source, such as a halogen lamp. By way of example, the laser may be configured as a semiconductor-diode laser, a gas or a solid-state laser. The beam 3 of illumination light is guided to the object 4 using an optical system which includes a beam multiplier 5, a beam splitter 6 and focusing optics 7. The beam 3 of illumination light may include one or more wavelengths within the range of 200 nanometers and 1800 nanometers or within a range of between 300 nanometers and 1500 nanometers. More specifically, it may have a wavelength that is suitable for exciting commonly used fluorophores, such as DAPI, FITC, or several species of fluorescent proteins, which typically operate with excitation wavelengths ranging from the near ultraviolet, through the visible range, to the near infrared.

The beam multiplier 5 receives the beam 3 of illumination light which is generated by the light source 2, to generate a plurality of beamlets 8 and 9 of illumination light. The configuration of the beam multiplier 5 and the beamlets 8 and 9 will be described in detail further below with reference to the second and third exemplary embodiments described in connection with FIGS. 4 and 6. For simplicity of illustration, in FIG. 1, only two beamlets 8 and 9 are shown. However, it is conceivable that the beam multiplier generates more than two beamlets, such as more than 5 beamlets or more than 10 beamlets. The number of beamlets may be less than 500 or less than 130.

The beamlets 8 and 9, which are emitted by the beam multiplier 5 are incident on the beam splitter 6. The beam splitter 6 may be configured as a wavelength-sensitive beam splitter, such as a dichroic beam splitter, which transmits different wavelengths than it reflects. Additionally or alternatively, the beam splitter 6 may be configured as a cube beam splitter. The beam splitter 6, which is shown in FIG. 1, is configured so that the portion of illumination light which is reflected, is suppressed compared to the portion of illumination light which is transmitted unreflected. Further, the portion of unreflected detection light is suppressed compared to the portion the detection light which is reflected. In an alternative embodiment, the beam splitter 6 is configured so that the portion of illumination light, which is transmitted unreflected, is suppressed compared to the portion of illumination light which is reflected and the portion of detection light which is reflected is suppressed compared to the portion of detection light which is transmitted unreflected.

The beamlets 8 and 9 of illumination light, which exit from the beam splitter 6 are incident on focusing optics 7, which are configured to focus each of the beamlets 8 and 9 onto a line focus $LF_1$, $LF_2$ within the object 4. In FIG. 1, the axes of the line foci $LF_1$ and $LF_2$ are oriented perpendicular to the paper plane. The number of line foci $LF_1$ and $LF_2$ is equal to the number of beamlets 8 and 9. In alternative embodiments, it is also conceivable that the number of line foci is greater or smaller than the number of beamlets 8 and 9.

The focusing optics 7 are rotationally symmetric or substantially rotationally symmetric. The focusing optics 7 define an optical axis A1, along which the illumination light is incident on the object 4.

It is to be understood that configurations are conceivable in which the focusing optics 7 substantially deviate from a rotational symmetry. By way of example, the focusing optics 7 may include one or more plane-symmetric optical elements, such as a cylinder lens. For plane-symmetric optical elements, the optical axis lies within the symmetry plane. Furthermore, the invention is not limited to focusing optics 7 having only one optical axis. By way of example, the focusing optics 7 may include an array of optical elements, which define a plurality of optical axes along which the illumination light is incident on the object.

Figure 2:
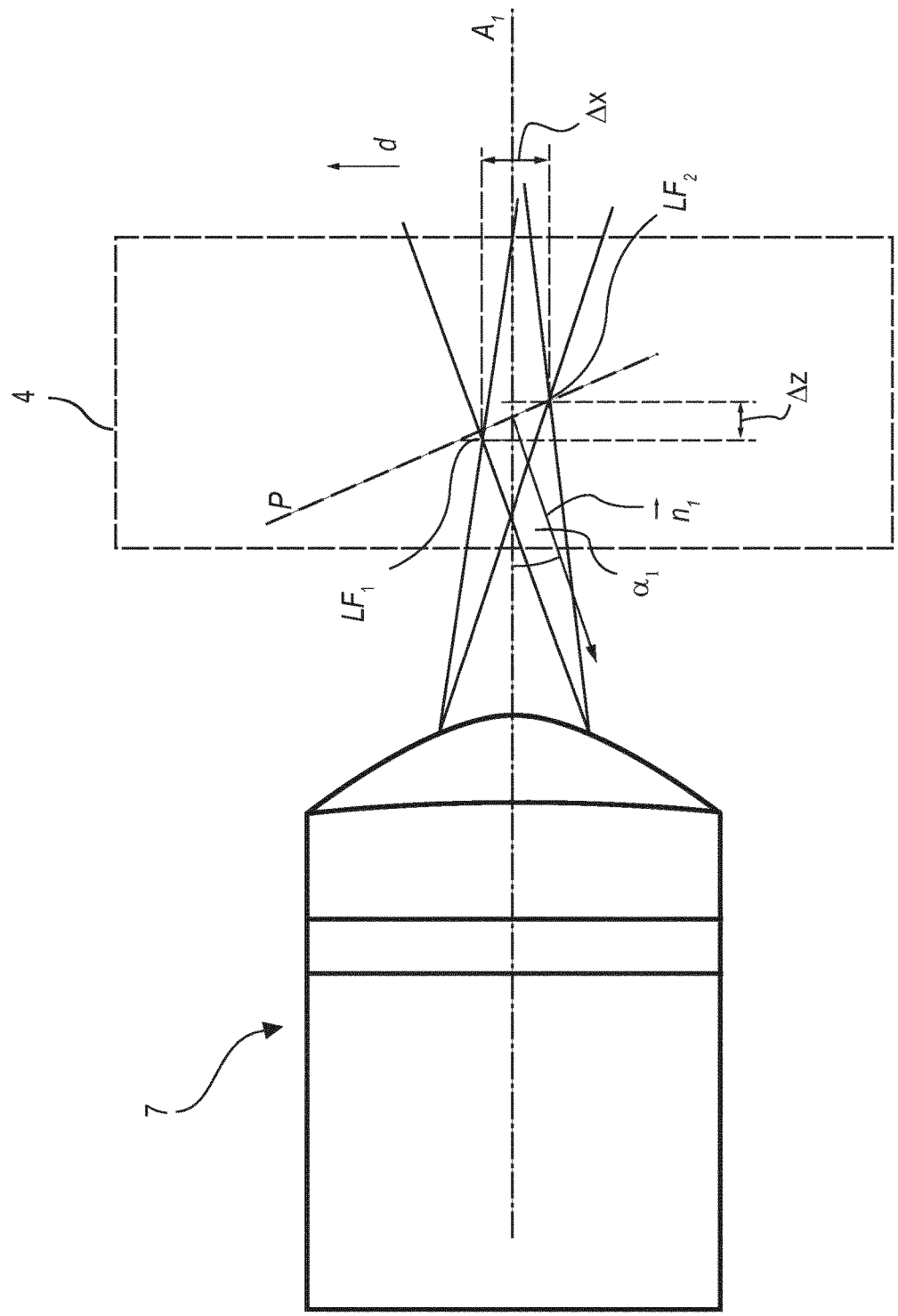
FIG. 2 is a schematic illustration of the focusing optics and the line foci which are generated using the imaging system of the first exemplary embodiment, which is schematically illustrated in FIG. 1.

As is illustrated in more detail in FIG. 2, the optical system is configured so that the line foci $LF_1$ and $LF_2$, when seen relative to the optical axis A1, are mutually displaced from each other in an axial direction and also mutually displaced from each other in a lateral direction (i.e. measured perpendicular to the optical axis A1). In the schematic illustration of FIG. 2, the longitudinal axes of the line foci $LF_1$ and $LF_2$ extend perpendicular to the paper plane and parallel to each other. It is to be understood that the line foci $LF_1$ and $LF_2$ do not need to extend parallel relative to each other. It is further to be understood that the line foci $LF_1$ and $LF_2$ do not necessarily represent perfect lines having a constant width and/or a constant intensity in a direction along the line focus' axis. Rather, each of the line foci $LF_1$ and $LF_2$ may have an elliptical or substantially elliptical beam profile having a variable width along its longitudinal axis. Specifically, when seen along the line focus' longitudinal axis, the intensity profile may have an intensity maximum, wherein the intensity profile tapers off on either side of the intensity maximum.

Specifically, as is illustrated in FIG. 2, the line focus $LF_1$ and the line focus $LF_2$, when measured along the optical axis A1, are displaced from each other by an axial separation distance $\Delta z$ (measured along the optical axis A1) and by a lateral separation distance $\Delta x$ (measured along a direction d, which is perpendicular relative to the optical axis A1). The lateral separation distance $\Delta x$ is selected so that for each of the line foci $LF_1$ and $LF_2$, confocal detection of detection light 27, 28 which is emitted from the respective line focus $LF_1$ and $LF_2$ in response to the illumination light can be separately performed by using the optical system and the detector system 12 (shown in FIG. 1), which is configured to detect the detection light.

In other words, a sufficiently large lateral separation distance $\Delta x$ allows, for each of the line foci $LF_1$ and $LF_2$, confocal detection of the detection light 27, 28 emitted from the respective line focus $LF_1$, $LF_2$ without crosstalk from the neighboring line focus.

By way of example, the optical system may be configured so that the lateral displacement distance $\Delta x$ between the line foci may be larger than 0.5 times or larger than 2 times the diffraction-limited width of the line foci $LF_1$ and $LF_2$ measured along the lateral direction d. The lateral displacement distance $\Delta x$ may be less than 100 times or less than 1000 times the diffraction-limited width. The line foci LF 1 and $LF_2$ lie within a common plane P, wherein a normal vector $n_1$ to the plane P is angled relative to the optical axis $A_1$. By way of example, an angle $a_l$ formed by the normal vector $n_1$ and the optical axis $A_1$ may be greater than 0.01 degrees or greater than 0.03 degrees. The angle $a_1$ may be less than 6 degrees or less than 4.5 degrees. If the imaging system generates more than two line foci, each of the line foci may lie within the common plane P.

It has been shown by the inventor that a different configuration (which is not covered by the claims) in which the line foci are located in an object plane which is perpendicular to the optical axis and in which the object is tilted relative to the object plane, results in significant aberrations which severely degrade the resolution of the microscopic imaging system. Specifically, these aberrations are dominated by coma and astigmatism. The inventor has further shown that such aberrations do not occur if a configuration is used in which the line foci $LF_1$ and $LF_2$ are axially and laterally displaced relative from each other, as has described above in connection with FIG. 2.

Returning to FIG. 1, the optical system of the imaging system 1 is further configured to image each of the line foci $LF_1$ and $LF_2$ on a respective light receiving portion $SP_1$ and $SP_2$ on a light receiving surface 10 of the light-sensitive detector system 12, on which a plurality of light-sensitive detector elements of the light-sensitive detector system 12 are arranged, as will be described in detail below in connection with FIG. 3. Therefore, the light receiving portions $SP_1$ and $SP_2$ are substantially located at positions, which are optically conjugate to the locations of the line foci $LF_1$ and $LF_2$ within the object 4. The light receiving portions $SP_1$ and $SP_2$ are non-overlapping.

As can be seen from FIG. 1, the optically conjugate positions of the light receiving portions $SP_1$ and $SP_2$ are achieved by tilting the light receiving surface 10 of the light-sensitive detector system 12 with respect to the optical axis $A_2$ along which the detecting light is incident on the light-sensitive detector system 12 so that a surface normal $\vec{n}_2$ to the light receiving surface 10 and the optical axis $A_2$ forms an angle $a_2$ which depends on the angle al (shown in FIG. 2) formed by the normal vector $\vec{n}_1$ and the optical axis $A_1$. Therefore, the detector system 12 is configured to compensate for the axial displacement of the line foci $LF_1$ and $LF_2$ within the object 4. By way of example, the angle $a_2$ may be greater than 1 degrees or greater than 3 degrees. The angle $a_2$ may be less than 60 degrees or less than 45 degrees. It is to be noted that, depending on the configuration of the optical system (in particular depending on the configuration of the beam splitter 6), the optical axes $A_1$ and $A_2$ may be parallel relative to each other, may be angled 90 degrees or may be angled at an angle which is different from 90 degrees.

Additionally or alternatively, it is conceivable that the optical system is configured to at least partially compensate for for the axial displacement of the line foci $LF_1$ and $LF_2$ within the object 4. By way of example, the optical system may include an array of refractive optical elements having different values of refractive optical power. For each of the line foci $LF_1$ and $LF_2$, the detection light 27, 28 which is emitted from the respective line focus $LF_1$, $LF_2$, may traverse one of the refractive optical elements so that detection light from different line foci $LF_1$, $LF_2$, traverse different refractive elements.

As is further schematically indicated in FIG. 1, the object 4 is moved along a scanning direction $\vec{s}$ relative to the foci $LF_1$ and $LF_2$ for scanning the line foci $LF_1$ and $LF_2$ through the object 4. The scanning movement is performed using a scanning stage (not shown in FIG. 1) on which the object 4 is mounted and which is configured to displace the object 4 relative to the foci $LF_1$ and $LF_2$. The scanning direction g is oriented perpendicular or substantially perpendicular to the longitudinal axis of each of the line foci $LF_1$ and $LF_2$. It is, however, also conceivable that the scanning direction $\vec{s}$ is angled relative to the axes of the line foci $LF_1$ and $LF_2$ at an angle which is significantly less than 90 degrees. The scanning direction $\vec{s}$ is also angled relative to the common plane P, within which the line foci $LF_1$ and $LF_2$ extend. As will be discussed in detail further in connection with FIG. 3, the scanning movement allows acquisition of three-dimensional confocal image data from the volume of the object 4.

Figure 3:
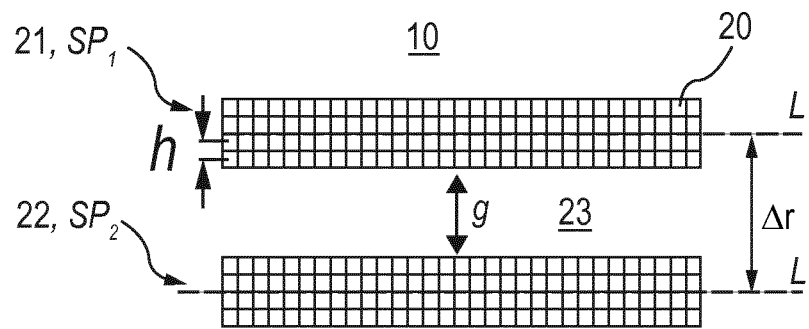
FIG. 3 is a schematic illustration of an arrangement of light-sensitive detector elements on a light receiving surface of a detector system of the imaging system of the first exemplary embodiment, which is schematically illustrated in FIG. 1.

FIG. 3 schematically illustrates the arrangement of light-sensitive detector elements 20 on the light receiving surface 10 of the detector system 12 (shown in FIG. 1). The light-sensitive detector elements 20 have a light-sensitive surface and are pixels. Each of the light-sensitive detector elements is configured to separately detect a respective portion of the detection light emitted from the object. For each of the foci $LF_1$ and $LF_2$, an array 21, 22 of the light sensitive detector elements 20 is provided, wherein each of the arrays 21 and 22 represents a pixel block formed from a plurality of pixel lines and represents one of the light receiving portions $SP_1$ and $SP_2$. Each of the arrays 21 and 22 may be configured as a TDI (time delay integration) block. In a portion of the light receiving surface 10, which is located between the arrays 21 and 22, no further detector elements are arranged so that a non-photosensitive surface region 23 is formed. By way of example, a width g of the non-photosensitive surface region 23 (i.e. a separation distance between the light-sensitive surfaces of the detector elements of the neighboring arrays 21 and 22), measured perpendicular to a longitudinal axis L of the arrays 21 and 22 may be greater than 4 or greater than 12 times the pixel size (measured along an edge of a square-shaped pixel). Additionally or alternatively, for each pair of neighboring light sensitive surfaces, which is in one of the arrays 21 and 22, a displacement h between the light-sensitive surfaces of the pair is less than 0.25 times, or less than 0.1 times, or less than 0.05 times the separation distance g. The width g may be less than 15 times or less than 45 times or less than 60 times or less than 100 times or less than 200 times the displacement h.

Each of the arrays 21 and 22 is dimensioned so that it acts as a confocal spatial filter, which acts in a similar manner as a pinhole in conventional scanning confocal microscopes. Therefore, for each of the line foci $LF_1$, $LF_2$, the respective array 21, 22 allows confocal filtering of the detection light for filtering out detection light emitted from the respective line focus and for suppressing light which is emitted from axial and/lateral positions which are different from the respective line focus. It is, however, also conceivable that each of the arrays 21, 22 have an extent which is larger than required for performing the confocal filtering and that the confocal filtering is provided by using only detection signals from a portion of the light-sensitive detector elements 20 of the arrays 21, 22. Further, it is also conceivable that for performing the confocal filtering, a conventional image sensor is used and for each of the line foci $LF_1$, and $LF_2$, the detector signals of a portion of the light-sensitive pixels of the image sensor is used so that the pixels provide the required confocal filtering. This provides the advantage of using a readily available off-the-shelf component.

Furthermore, the plurality of light-sensitive detector elements 20 within each of the arrays 21 and 22 allow spatially resolved light detection within each of the line foci $LF_1$, and $LF_2$ in a direction along the longitudinal axis of the line foci $LF_1$, and $LF_2$ and/or in a width direction of the line foci $LF_1$, and $LF_2$.

Compared to conventional two-dimensional image sensors, the light-sensitive detector system 12 of the present embodiment prevents detecting pixel signals which do not provide useful information, since the light receiving surface 10 only has light sensitive detector elements at focus positions of the detection light, i.e. at the light receiving portions $SP_1$ and $SP_2$, which are optically conjugate to the locations of the foci $LF_1$ and $LF_2$ in the object 4. Further, the detector system 12 of the present embodiment is configured so that in the non-photosensitive region 23, at least a portion of the read out electronics (logic and connective circuitry, in particular charge to voltage converters CVC) is arranged. Thereby, more circuitry can be arranged on the light-sensitive detector system 12 so that a higher read-out-speed can be obtained. The circuitry in the non-photosensitive region also allows providing an increased fill factor in the arrays 21 and 22 of detector elements so that the light collection efficiency within the foci $LF_1$ and $LF_2$ can be improved.

Figure 4:
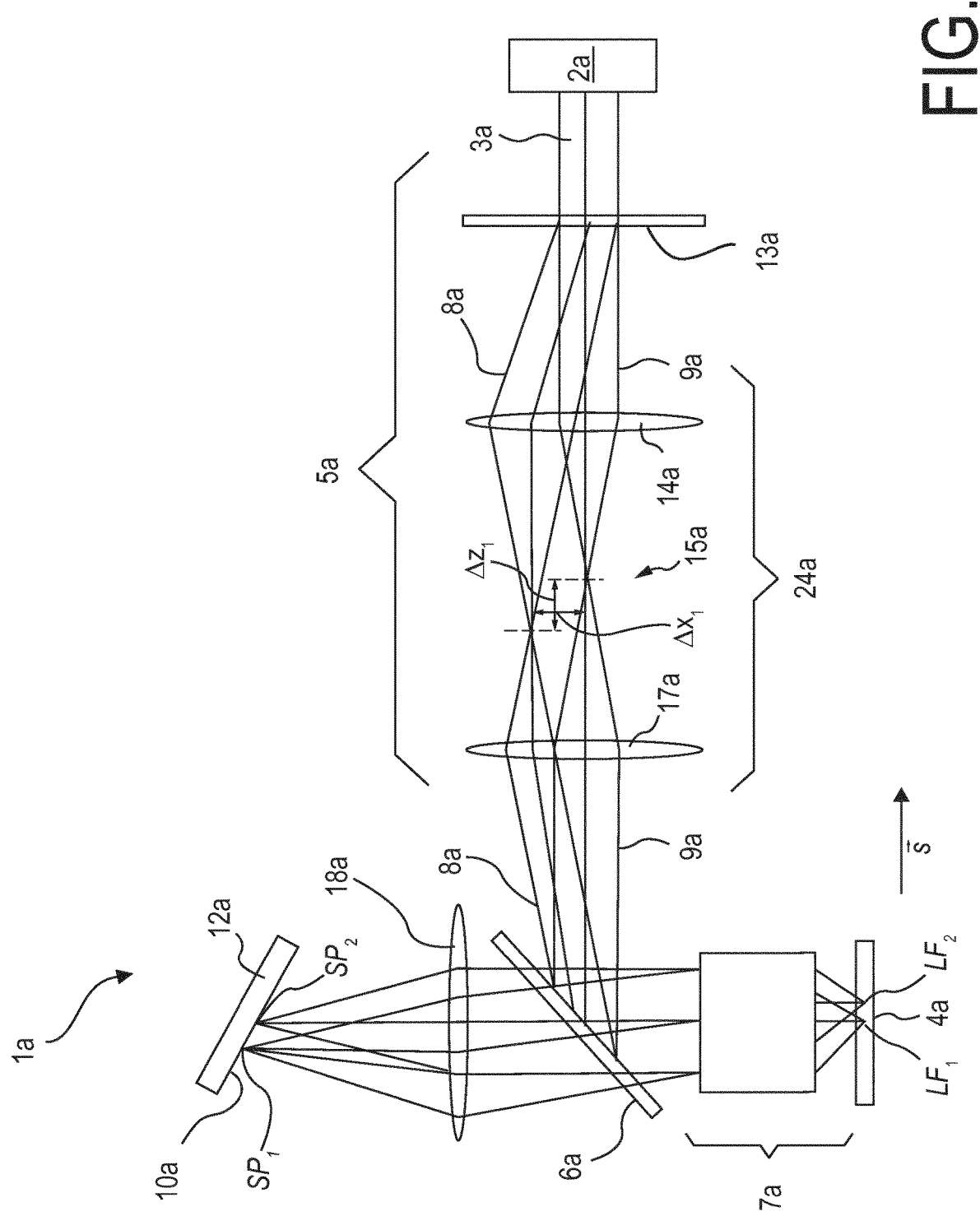
FIG. 4 is a schematic illustration of an imaging system according to a second exemplary embodiment.

FIG. 4 is a schematic illustration of a microscopic imaging system 1 a according to a second exemplary embodiment. Components of the imaging system 1 a, which are similar or corresponding to components of the first exemplary embodiment illustrated in FIGS. 1 to 3, bear the same numerals but are succeeded by the suffix letter "a" to avoid confusion.

In the imaging system 1 a of the second exemplary embodiment, the beam multiplication system 5a includes a diffractive optical element 13a which is in the path of the illumination light between the light source 2a and the beam separator 6a. The reflective optical element 13a may include a grating, which may be configured to function as a reflective grating or as a transmissive grating. By way of example, the grating may include an electrically addressable and/or an optically addressable grating. Examples for electrically and/or optically addressable gratings are spatial light modulators. The spatial light modulator may use liquid-crystal technology. The spatial light modulator may include an array of pixels, wherein each of the pixels generates a phase delay to a portion of the beam 3a of illumination light, which traverses or impinges on the respective pixel. The phase delay may be adjustable by means of a signal provided to the spatial light modulator. The signal may be an electrical and/or an optical signal. The diffractive plane defined by the diffractive optical element 13a may be a pupil plane of the focusing optics 7a or of the optics, which focuses the illumination light, which exits from the diffractive optical element, into the foci (point foci or line foci) within the object.

Additionally or alternatively, the diffractive optical element 13a may include an optical element which imparts non-adjustable phase delays to the beam 3a of illumination light which is incident on the diffractive optical element 13a. By way of example, the diffractive optical element 13a includes a plate made of glass, quartz and/or a polymer, such as polycarbonate. The plate may have a surface structure, such as a corrugated surface structure, which is configured to generate a desired variation in optical path length across the beam profile, which generates the plurality of beamlets. The corrugated surface structure may be generated using an etching and/or embossing process.

As will be described hereinafter, the beamlets 8a, 9a, which are generated using the diffractive optical element 13a are configured so that the focusing optics 7a, which include an objective lens, focus these beamlets into the line foci $LF_1$ and $LF_2$ with their mutual axial and lateral displacement as described above. For simplicity of description, the following description of a design process for the diffractive optical element 13a relates to a transmissive grating. However, the principles can be adapted to design reflective gratings.

The diffractive optical element 13a is configured so that the illumination light, which is transmitted through the beam multiplication system 5a includes a plurality of beamlets 8a, 9a so that each of the beamlets diverges from or converges toward a real or virtual focus. The real or virtual foci are displaced from each other. The diffractive optical element 13a is configured so that the displacement of the real or virtual foci causes the lateral and axial displacement of the line foci in the object 4a. Specifically, in the imaging system 1a according to the second exemplary embodiment, the beamlets 8a and 9a in a region between the beam multiplication system 5a and the beam splitter 6a have different divergences which relate to virtual foci (not shown in FIG. 4) from which the beamlets 8a, 9a, diverge and which are displaced from each other. The focusing optics 7a are configured to image each of these virtual foci into one of the line foci $LF_1$ and $LF_2$ within the object. Therefore, with respect to the focusing optics 7a, the virtual foci on the one hand and the line foci $LF_1$ and $LF_2$ on the other hand are located at optically conjugate positions.

As can further be seen from FIG. 4, the beam multiplication system 5a includes adaptation optics 24a, which are disposed in the illumination light between the diffractive optical element 13a and the beam splitter 6a. The adaptation optics 24a function as a beam expander which adapts the cross-sections of each of the beamlets 8a, 9a to the entrance pupil of the focusing optics 7a. Adapting the beam diameters to the entrance pupil of the focusing optics 7a, allows generation of line foci $LF_1$ and $LF_2$ in the object 4a, which have a comparatively small width, since the full numerical aperture of the focusing optics 7a is used. Thereby, an optimal lateral and axial resolution of the confocal scanning microscope can be obtained.

In the exemplary embodiment, which is shown in FIG. 4, the adaptation optics 24a are configured as an afocal Keplerian telescope having two relay lenses 14a and 17a, the principal planes of which being displaced from each other by the sum of their focal lengths. In alternative embodiments, other configurations of the adaptation optics are contemplated, which are not configured as a Keplerian telescope or which are not configured to be afocal.

Since the adaptation optics 24a are disposed in the beamlets 8a, 9a of the illumination light between the diffractive optical element 13a and the beam splitter 6a, the adaptation optics 24a are located out of the path of the detection light. Thereby, it is prevented that the intensity of the detected light on the light receiving surface 10a of the light-sensitive detector 12a is reduced by the adaptation optics 24a. Thereby, an improved low light sensitivity can be obtained. However, it should be noted that for many applications, a sufficient low light sensitivity can be obtained if the adaptation optics 24a are traversed by the illumination light as well as by the detection light.

The diffractive optical element 13a is configured to impart a phase W(x,y) on the incident beam 3 of illumination light, wherein (x,y) are the coordinate values in a plane defined by the diffractive optical element 13a, which, in the exemplary embodiment, is oriented perpendicular to a beam axis of the beam 3a of illumination light.

The plane can be divided into a plurality of zones, wherein to each of the zones, a discrete index j is assigned, which is denoted herein as the zone index.

Points with coordinates (x,y) are in zone j if the following holds true:

$$j\lambda \leq K(x,y) < (j+1)\lambda,$$

where $\lambda$ is the beam wavelength, and $K(x,y)$ is a function which is denoted herein as the zone function. As an illustrative example, in a conventional grating, the zone function is a linear function of x. Within each zone j, a variable t that takes values $0 \leq t < 1$ is defined by:

$$t = \frac{K(x,y)}{\lambda} - \text{floor}\left(\frac{K(x,y)}{\lambda}\right),$$

where floor(x) is defined as the largest integer which is smaller than x. The phase profile W(x,y), which is added to the incoming beam 3a of illumination light, is defined by a function $f(t)$, which is denoted herein as the profile function, according to:

$$W(x,y) = f(t) = f\left(\frac{K(x,y)}{\lambda} - \text{floor}\left(\frac{K(x,y)}{\lambda}\right)\right).$$

The profile function $f(t)$, therefore, depends on the shape of the grating within each zone. The complex valued transmission function for the diffractive optical element 13a, which is defined as $$T(x,y) = \exp\left(\frac{2\pi i W(x,y)}{\lambda}\right)$$

can be written as a sum over diffraction orders with index m:

$$T(x,y) = \Sigma_{m=-\infty}^{\infty} C_m \exp(2\pi i m K(x,y)),$$

wherein:

$$C_m = \int_0^1 dt \, \exp(-2\pi i m t) \exp\left(\frac{2\pi i f(t)}{\lambda}\right).$$

The diffraction efficiency of order m is $\eta_m = |C_m|^2$.

It follows from the foregoing that the profile function $f(t)$ can be designed to give a desired distribution of light intensity over the diffraction orders m, and the zone function $K(x,y)$ can be designed to give a desired phase to the different contributing orders m.

In order to obtain the axial and lateral displacement of the line foci $LF_1$ and $LF_2$, as described above, the following zone function $K(x,y)$ can be chosen:

$$K(x,y) = ax + b(x^2 + y^2).$$

As can be seen from the following equations, a and b are coefficients that determine the lateral and axial displacement between the line foci $LF_1$ and $LF_2$. Referring to FIG. 4, if $F_{14a}$ is the focal length of relay lens 14a, then, the lateral displacement $\Delta x_1$ between the focal lines generated in the region 15a between lenses 14a and 17a and close to the location of the focal plane of relay lens 14a is given by:

$$\Delta x_1 = a F_{14a} \lambda,$$

and the axial displacement $\Delta z_1$ between the focal lines is given by:

$$\Delta z_1 = 2 b F_{14a}^2 \lambda.$$

The lateral magnification between the line foci in the region 15a and the foci in the object 4a is $M_{15a4a} = F_{17a}/F_{7b}$, with $F_{17a}$ being the focal length of relay lens 17a and $F_{7a}$ being the focal length of the focusing optics 7a, which may include or may be formed by an objective lens. This leads to the following expressions for the lateral displacement $\Delta x$ (see FIG. 2) and the axial displacement $\Delta z$ between the line foci $LF_1$ and $LF_2$ in the object 4a:

$$\Delta x = M_{15a4a} \Delta x_1$$

$$\Delta z = n M_{15a4a}^2 \Delta z_1,$$

where n is the refractive index in the object 4a, which is typically close to the refractive index of water for biological samples. The magnification step from the object 4a to the sensor 12a can be handled in exactly the same way as described above. The lateral magnification is $M_{4a12a} = F_{18a}/F_{7a}$ with $F_{18a}$ being the focal length of the tube lens 18a, giving a lateral displacement $\Delta x_2$ and an axial displacement $\Delta z_2$ of the line foci on the light receiving portions $SP_1$ and $SP_2$ on the light receiving surface 10a of the light-sensitive detector 12a:

$$\Delta x_2 = M_{4a12a} \Delta x$$

$$\Delta z_2 = \frac{M_{4a12a}^2}{n} \Delta z.$$

The angle $\alpha_2$ (illustrated for the first exemplary embodiment in FIG. 1) formed between the normal vector to the light receiving surface 10a and the optical axis along which the detection light is incident on the light receiving surface 10a must satisfy the condition:

$$\frac{\Delta z_2}{\Delta x_2} = \tan \alpha_2,$$

and Δr (shown in FIG. 3 for the first exemplary embodiment), which is the displacement between adjacent arrays 21, 22 of light-sensitive detector elements 20 of the light receiving surface 10a, must satisfy the following condition:

$$\frac{\Delta x_2}{\cos \alpha_2} = p \Delta r$$

with p being an integer.

The zone function K(x,y) can be improved by adding higher order terms which depend on the coordinates x and y in order to compensate for the spherical aberration that occurs when beams of high NA are focused by the focusing optics 7a to form the line foci $LF_1$ and $LF_2$ within the object 4a, or in order to compensate spherical aberration that occurs by other causes, such as lens manufacturing errors. Objective lenses with high numerical aperture are known to comprise multiple lens elements, assembled in such a way that errors in the curvature and/or the thickness of the lens elements easily give rise to spherical aberration In a further alternative embodiment, the diffractive optical element 13 is configured so that the focusing optics 7a, focuses the beamlets 8a, 9a into a plurality of line foci within the object 4. The inventors have shown that this can, for example, be achieved by adapting the phase profile W (x,y), which has been described above, by adding a phase profile $W_{ast}$ (y) of two-fold rotational symmetry within the diffractive plane so that the total phase profile $W_{tot}$ (x,y), which is added to the incoming beam 3a of illumination light (having plane wavefronts), is expressed as:

$$W_{tot}(x, y) = W(x, y) + W_{ast}(y),$$

which transforms the point foci into line foci within the object. Specifically, the phase profile $W_{tot}(x,y)$, which has a two-fold rotational symmetry, causes each of the beamlets to be astigmatic. The above polynomial $W_{tot}(x,y)$ represents a polynomial representation, which is an uniquely determined polynomial representation and which has its origin on an optical axis of the beam multiplication system 5a and/or the focusing optics 7a and in the diffraction plane of the diffraction optical element 13a. $W_{ast}(y)$ is an univariate monomial or an univariate polynomial and is an additive component of $W_{tot}(x,y)$.

The inventor has further shown that different expressions of the phase profile $W_{ast}(y)$ can be used to generate line foci of different levels of homogeneity with regards to line width and intensity.

By way of example, according to an exemplary embodiment, the phase profile $W_{ast}(y)$ is expressed by the following formula:

$$W_{ast}(y) = \frac{1}{2} c \left( \frac{y}{F \cdot NA} \right)^2,$$

with c being a constant so that $W_{ast}(y)$ is an univariate term of degree 2. The value c/NA is a measure for the length of the line focus, since it corresponds substantially to the length of the line focus. F is the object-side focal length of the focusing optics 7a (i.e. the focal length for the section of the illumination light, which converges toward the line foci within the object) and NA is the numerical aperture at the object 4. The inventor has further shown that using the above phase profile $W_{ast}(y)$, the line intensity of each of the line foci within the object 4 can be described by:

$$I_f(x_1, y_1) = A \left(1 - \left(\frac{NA\, y_1}{c}\right)^2\right) sinc\left(2\pi \sqrt{1 - \left(\frac{NA\, y_1}{c}\right)^2}\, \frac{x_1 NA}{\lambda}\right),$$

with λ being the wavelength, A being a constant, and sinc (x) being defined as sinc(x)=sin (x)/x. $x_1$ is a coordinate perpendicular to a longitudinal axis of the line focus and $y_1$ is a coordinate in a direction along the longitudinal axis of the line focus.

From this expression, it follows that, as seen along the longitudinal axis of the line focus, the peak intensity varies as $$\left(1 - \left(\frac{NA\, y_1}{c}\right)^2\right)$$

and the line width varies as $$1 \bigg/ \sqrt{1 - \left(\frac{NA\, y_1}{c}\right)^2}.$$

The inventor has further shown that it is possible to adapt the phase profile $W_{ast}(y)$ of the diffractive optical element 13a so that the variation of the intensity and the line width is reduced. By way of example, the inventor has shown that using a phase profile $W_{ast}(y)$, which has the form $$W_{ast}(y) = \frac{3}{4} wNA \left[ \left(\frac{y}{F \cdot NA}\right)^2 + \frac{1}{p}\left(\frac{y}{F \cdot NA}\right)^4 \right]$$

(i.e. an univariate polynomial, which consists of terms of degree 2 and 4) results in less variation of peak intensity and line width. The value w is a measure for the length of the line focus, since 2w is substantially equal to the length of the line focus. It is conceivable that $W_{ast}(y)$ includes univariate terms of other degrees than 2 and 4 in order to further reduce intensity variation and/or line width variation of the line foci.

In this equation, the parameter p (which is a measure for a ratio of the coefficient of the term of degree 2 to the term of degree 4) is within a range of between −3 and −10, or in a range of between −4 to −8. The inventor has shown that a particular advantageous configuration is provided if p has a value of −6.

The inventor has further shown that, additionally or alternatively, less fluctuation in intensity and line width can be obtained, if the ratio ($R=C_1/C_2$) of the coefficient of the second-degree term $$\left(C_1 = \frac{3w}{4F^2 NA}\right)$$

to the coefficient of the fourth-degree term $$\left(C_2 = \frac{3w}{4F^4NA^3}\right)$$

has a value, which is between −1 and −11 times the radius of the beam cross-section of the illumination light at a position, where the illumination light traverses the diffractive optical element. The radius may correspond to a half of the FWHM (full width at half maximum). Even lesser fluctuations can be obtained if the ratio is between −3 and −9 times or between −5 and −7 times the radius of the beam cross-section.

Therefore, it has been shown by the inventor that by using a phase profile $W_{ast}(y)$, which includes or which represents or substantially represents a univariate term or a univariate polynomial of a degree equal or greater than 4, a more homogeneous intensity and line width along the longitudinal axis of the line foci can be obtained. This allows achieving an improved, homogeneous resolution, as well as an improved, homogeneous, dynamic range of image intensities along the longitudinal axis. However, it has also been shown that—depending on the application—a sufficient performance of the imaging system can be obtained using a phase profile $W_{ast}(y)$, which represents or substantially represents an univariate term of a degree of 2.

In a further alternative embodiment, in which point foci or line foci are generated within the object, the diffractive optical element 13a is configured to have the following zone function:

$$K(x,y) = ax + b\sqrt{n^2 - (x^2 + y^2)/F^2},$$

wherein n is the refractive index of the sample, F is the object-side focal length of the focusing optics 7a (i.e. the focal length for the section of the illumination light, which converges toward the foci within the object), and x and y are coordinates in the diffractive plane of the diffractive optical element 13a.

It has been shown by the inventor that the above zone function generates a plurality of foci and also provides a correction for the spherical aberration caused by the focusing optics 7a so that the focusing optics 7a can be configured to have a comparatively high numerical aperture.

Specifically, it has been shown by the inventor that the above zone function allows correction of the spherical aberrations for a focusing optics 7a, which is configured to have a numerical aperture at the object, which is greater than or equal to 0.25, or greater than or equal to 0.5. The spherical aberration may be at least partially caused by the focusing optics 7a, in particular by an objective lens of the focusing opics. In other words, the diffractive optical element 13a is configured to at least partially compensate a spherical aberration of the focusing optics 7a, wherein the spherical aberration affects a shape and/or a position of at least a portion of the foci.

Further, the spherical aberration affecting the shape and/or the line width of two or more foci may be different for each of the foci. This makes it difficult to compensate the spherical aberration for all foci using a single corrector, which is configured to correct one value of spherical aberration. However, the inventor has shown that using one or more diffractive optical elements, in particular by using the above zone function, allows compensation of different amounts of spherical aberrations for each of the foci.

Furthermore, the inventor has also shown that the above zone function for correcting the spherical aberration can be combined with a phase profile $W_{ast}(y)$ (in particular an univariate phase function) of two-fold rotationally symmetry. Specifically, the phase profile $W_{ast}(y)$ can be added to the phase profile $W(x,y)$:

$$W(x, y) = f(t) = f\left(\frac{K(x,y)}{\lambda} - \text{floor}\left(\frac{K(x,y)}{\lambda}\right)\right),$$

with $K(x,y)$ being the zone function $K(x,y) = ax + b\sqrt{n^2 - (x^2 30y^2)/F^2}$ to get a $W_{tot}(x,y)$, which generates line foci within the object. $W_{ast}(y)$ may be an univariate term or an univariate polynomial of degree 2 or higher or of degree 4 or higher.

The present disclosure can also be applied to conventional image sensors, comprising a 2D array of adjacent pixels instead of a set of spatially separate line sensor elements, but still tilted at an angle $\alpha_2$. In that case the second constraint on the lateral displacement $\Delta r$ being matched to the distance between adjacent arrays 21, 22 (shown in FIG. 3) of light-sensitive detector elements 20 can be dropped, providing one more degree of freedom in the design of the diffractive optical element. This allows providing a cost-efficient design for a scanning confocal microscope.

As is explained in the following, a profile function $f(t)$ can be selected that distributes the power over a limited set of orders $m = m_1, \ldots, m_2$, where $m_1$ and $m_2$ are positive or negative integers, such that substantially all the power of the beam 3a of illumination light which is incident on the diffractive optical element 13a is concentrated into this set of diffraction orders, preferably such that each of the diffraction orders receive a substantially equal amount of power. This will give focal lines of approximately equal light intensity.

Specifically, the inventors have found that a suitable profile function can be determined by parameterizing the profile function $f(t)$ and finding the optimum parameters using a numerical search algorithm. For a profile function providing a symmetric distribution of power over the orders, i.e. $\eta_m = \eta_{-m}$, it follows from the expression for $C_m$ that $f(t) = f(-t)$. A suitable parameterization for $f(t)$ is therefore the following finite cosine series:

$$f(t) = \sum_{j=1}^{K} c_j \cos(2\pi j t).$$

An optimum distribution of the power over the 2N+1 diffraction orders is obtained when $\eta_i = n_i'$, where $$\eta_i' = \begin{cases} \frac{1}{2N+1}, & i \leq N \\ 0, & \text{otherwise} \end{cases}.$$

The cost function Z is defined as $$Z(C_0, \ldots, C_K) = \sum_{m=-M}^{K} (\eta_m - \eta_m')^2,$$

where an integer M>N is used. Now, the minimum of Z can be found for parameters $c_0, \ldots, c_K$ using a generic numerical search algorithm. As an initial condition, all $c_i$ are set to zero, except $c_0=1$.

Figure 5:
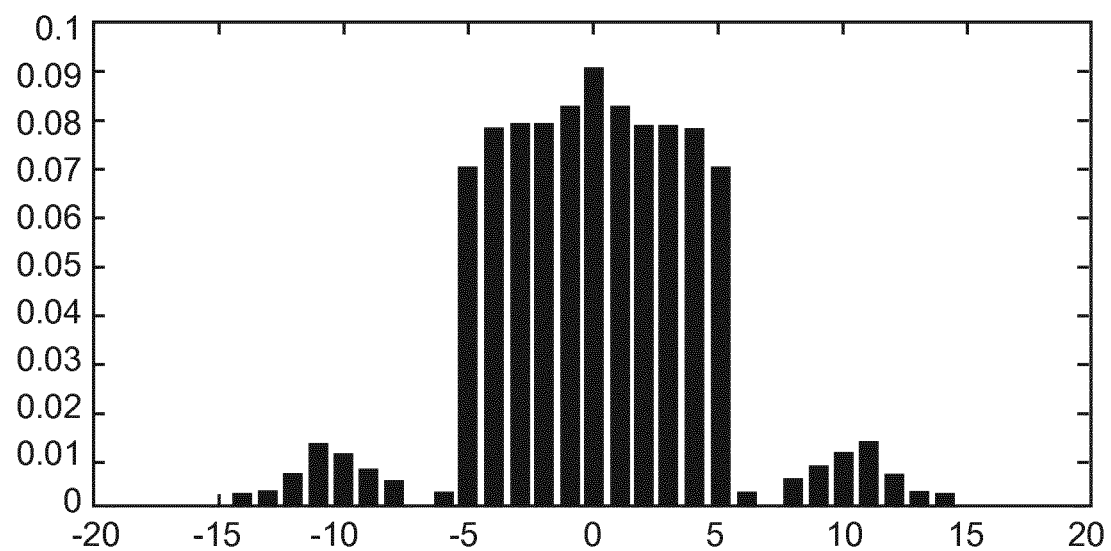
FIG. 5 schematically illustrates a distribution of input power over diffraction orders a beam multiplication system in the imaging system according to the second exemplary embodiment, which is shown in FIG. 4.

FIG. 5 is a histogram of the power of illumination light (y-axis) in arbitrary units versus diffraction order (x-axis) for a profile function $f(t)$ which was determined using the above-described method. As can be seen from FIG. 5, an optimal power distribution can be obtained for 11 lines, providing a suitable solution using the parameters N=5, K=14, M=15. The resulting profile function $f(t)$ concentrates 87% of the power of the beam 3a of illumination light which is incident on the diffractive optical element 13a (shown in FIG. 4) into the 11 diffraction orders. For each of these 11 diffraction orders, the power of the respective diffraction order varies from an average power value of these 11 diffraction orders by less than 5%.

Figure 6:
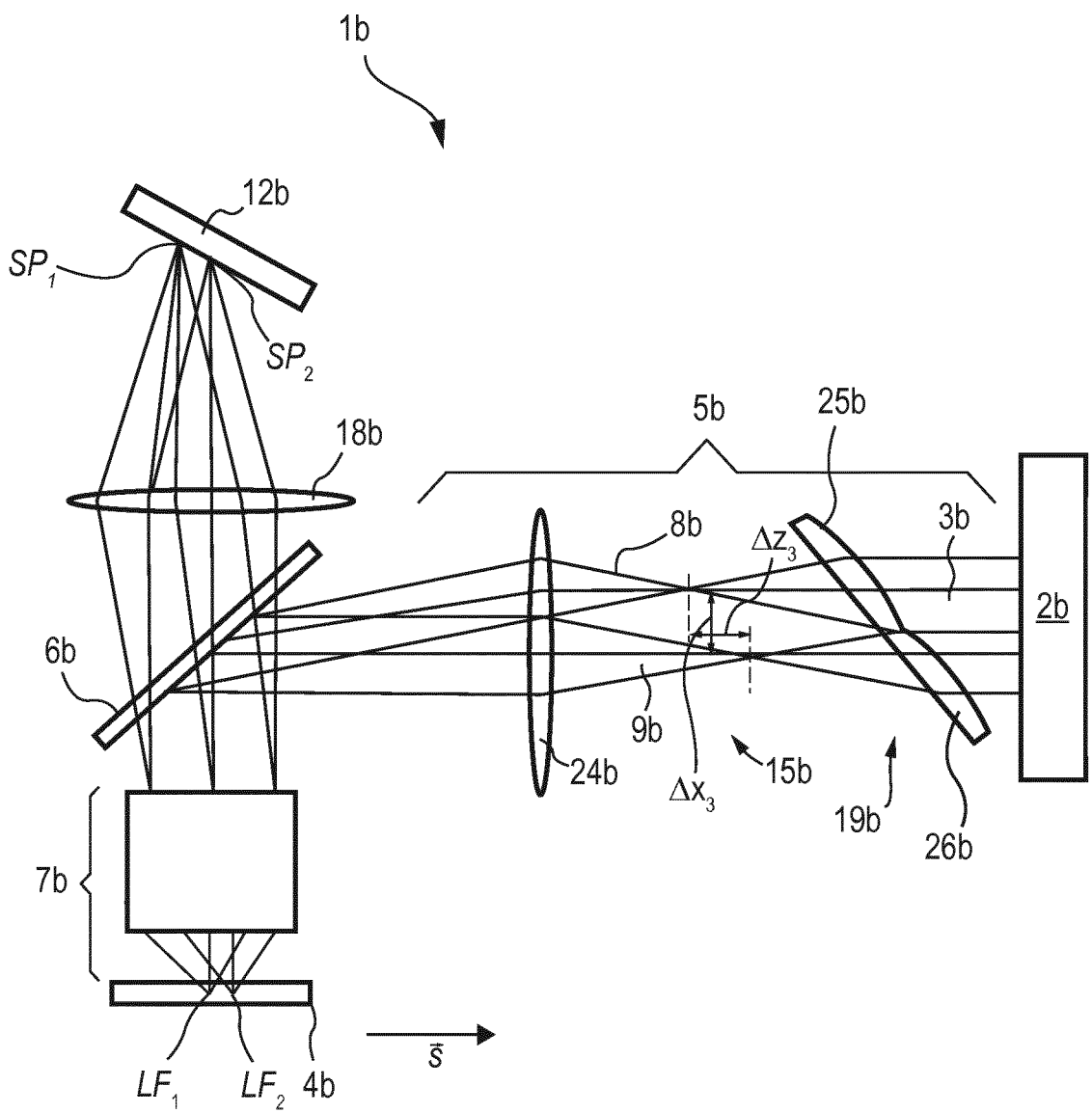
FIG. 6 is a schematic illustration of an imaging system according to a third exemplary embodiment.

FIG. 6 is a schematic illustration of a microscopic imaging system 1b according to a third exemplary embodiment. Components of the imaging system 1b, which are similar or corresponding to components of the first and second exemplary embodiments illustrated in FIGS. 1 to 5, bear the same numerals but are succeeded by the suffix letter "b" to avoid confusion.

The beam multiplication system 5b of the microscopic imaging system 1b includes an array 19b of refractive optical units 25b, 26b, each of which receiving a separate portion of the beam 3b of illumination light provided by the source 2b. Each of the refractive optical units 25b, 26b is configured to focus the respective portion of the beam 3b of illumination light, thereby forming one of the beamlets 8b, 9b. Each of the refractive optical units 25b, 26b is configured as a cylindrical lens. For each of the refractive optical units 25b, 26b, an optical axis of the respective refractive optical unit 25b, 26b is inclined relative to a beam axis of the beam 3b of illumination light which is incident on the array 19b.

Each of the beamlets 8b, 9b, which exits the respective refractive optical unit 25b, 26b is focused by the respective refractive optical unit 25b, 26b to form a line focus in a region between the array 19b and the adaptation optics 24b so that the line foci are displaced relative from each from each other by an axial distance $\Delta z_3$ and a lateral distance $\Delta x_3$. Since the imaging system 1b does not rely on a refractive optical element, it is possible use a halogen lamp as light source 2b. The foci in the region between the array 19b of refractive optical units 25b and 26b and the adaptation optics 24b are located at positions which are optically conjugate to the positions of the line foci $LF_1$ and $LF_2$ within the object 4b.

Although the microscopic imaging systems described in the exemplary embodiments above are configured as a scanning confocal microscopy systems, it is to be understood that the present invention is not limited to such systems. Specifically, it is conceivable that the teaching of the present disclosure is used for microscopy systems which provide no scanning functionality and/or do not rely on confocal detection. By way of example, the microscopic imaging system may be configured to inspect the reflectivity and/or fluorescent light emission at two-selected locations within the object which are located at different depths so that no scanning functionality is required. Further, if there are low requirements for the axial resolution, it is conceivable to detect the detection light without using confocal filtering of the detection light.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. A microscopic imaging system, the imaging system comprising:
  a light source for generating illumination light;
  an optical system;
  a detector system comprising light receiving portions ($SP_1$, $SP_2$) that are arranged in a common plane, wherein a normal ($n_2$) to the common plane is arranged at an angle ($\alpha_2$) relative to the optical axis ($A_2$) of the optical system along which detection light is incident on the light receiving portions ($SP_1$, $SP_2$), the angle ($\alpha_2$) dimensioned to at least partially compensate for an axial displacement of foci in an object;
  wherein the optical system is configured:
    to focus the illumination light to simultaneously form a plurality of foci within the object to be inspected so that the detection light is emitted by the object from the foci in response to the illumination light, wherein each of the foci is a line focus ($LF_1$, $LF_2$); and
    to direct the detection light to the detector system, which is configured to detect the detection light;
  wherein the optical system is further configured so that the foci, when seen relative to an optical axis ($A_1$) of the optical system along which the illumination light is incident on the object, are mutually displaced from each other in an axial direction and mutually displaced from each other in a lateral direction;
  wherein for each of the foci generated in the object, the detector system and the optical system are configured to substantially separately detect the detection light which is emitted from the respective focus;
  wherein the optical system and/or the detector system are configured to compensate for the displacement along the axial direction so that for each of the foci, the light receiving portions ($SP_1$, $SP_2$) of the detector system which receives a portion of the detection light is substantially located at a position which is optically conjugate to at least a portion of the respective focus;
  wherein the optical system comprises a beam multiplication system between the light source and the object, wherein the beam multiplication system is configured to generate a plurality of beamlets; and
  wherein the beam multiplication system comprises a diffractive optical element, wherein each of the beamlets corresponds to a diffraction order of the diffractive optical element,
  wherein the diffractive optical element is configured to at least partially compensate a spherical aberration of the optical system, wherein the spherical aberration affects a shape and/or a line width of at least one of the line foci ($LF_1$, $LF_2$),
  wherein the diffractive optical element is configured so that illumination light, which exits from the diffractive optical element has a phase profile, measured in a diffraction plane of the diffractive optical element,
  wherein the phase profile or an additive component of a polynomial representation of the phase profile has a substantially two-fold rotational symmetry.

2. The imaging system of claim 1, wherein for each of the line foci ($LF_1$, $LF_2$), the optical system and the detector system are configured for spatially resolved light detection within the respective line focus ($LF_1$, LF2).

3. The imaging system of claim 1, wherein each of the light receiving portions ($SP_1$, $SP_2$) is provided by a respective group of light-sensitive detector elements of the detector system, wherein each of the light-sensitive detector elements has a light-sensitive surface;
   wherein a non-photosensitive surface region separates the light-sensitive surfaces of the light-sensitive detector elements of neighboring groups; and
   wherein for each pair of the neighboring light sensitive surfaces which is in one of the groups, a displacement between the light-sensitive surfaces of the pair is less than 0.25 times, or less than 0.1 times, or less than 0.05 times the separation distance (g).

4. The imaging system of claim 1, wherein:
   the beam multiplication system is configured to generate the beamlets so that each of the beamlets has a real or virtual focus; and
   the optical system is configured to image each of the beamlets converging from or diverging toward the real or virtual focus into one of the line foci ($LF_1$, $LF_2$) within the object.

5. The imaging system of claim 1, wherein the two-fold rotationally symmetric phase profile or additive component is or substantially is an univariate term or an univariate polynomial of degree 2 or higher or degree 4 or higher.

6. The imaging system of claim 5, wherein the two-fold rotationally symmetric phase profile or additive component is or substantially is an univariate polynomial of degree 4 or higher;
   wherein for a ratio (R) of a coefficient of a second-degree term ($C_1$) of the polynomial to a coefficient of a fourth-degree term ($C_2$) of the polynomial, at least one of the following holds:
   (a) the ratio (R) has a value, which is within a range of between −1 and −11 times, or between −3 and −9 times, or between −5 and −7 times a radius of a beam cross-section of the illumination light at a position of the diffractive optical element; or
   (b) the ratio (R) is so that the value p, which is defined by $p = R/(F^2 \cdot NA^2)$, with R being the ratio, F being an object-side focal length of a focusing optics of the optical system, which focuses the beamlets into the line foci, and NA being the numerical aperture at the object, p has a value of between −3 and −10 or between −4 to −8.

7. The imaging system of claim 1, wherein the detector system is configured so that when seen relative to an optical axis ($A_2$) of the optical system along which the detection light is incident on the detector system, the light-receiving portions ($SP_1$, $SP_2$) for different line foci ($LF_1$, $LF_2$) are axially displaced from each other.

8. The imaging system of claim 1,
   wherein the angle ($\alpha_2$) is dimensioned to at least partially compensate for the axial displacement ($\Delta z$) of the foci in the object.

9. The imaging system of claim 1, wherein for each of the line foci ($LF_1$, $LF_2$), the optical system and the detector system are configured for confocal filtering of the detection light for filtering out at least a portion of the detection light emitted from the respective line focus ($LF_1$, LF2).

10. The imaging system of claim 1, further comprising a scanning system, wherein:
    the scanning system is configured so that a direction of scanning movement is substantially perpendicular to an axis of at least one of the line foci ($LF_1$, $LF_2$).

11. The imaging system of claim 1, further comprising a beam splitter system configured to separate the detection light and the illumination light.

12. The imaging system of claim 11, wherein the beam splitter system comprises a dichroic mirror.

13. The imaging system of claim 11, wherein the beam splitter system comprises a cube beam splitter.

* * * * *